Figure 5:
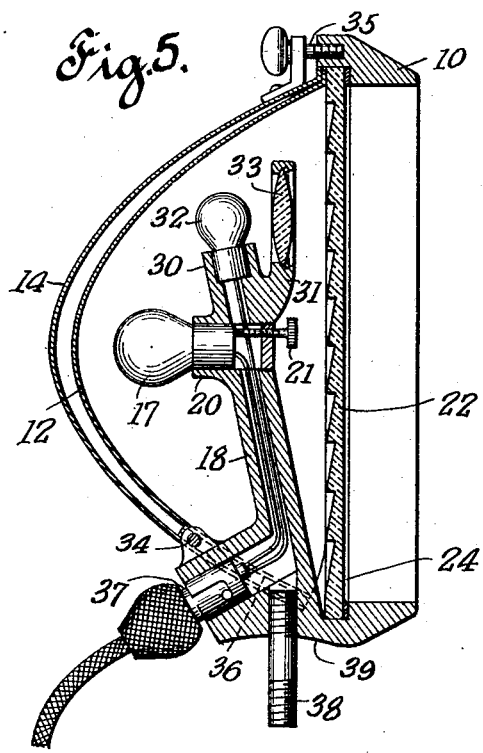

April 28, 1931.  E. B. NEIL  1,802,524
LAMP
Filed Dec. 29, 1928  2 Sheets-Sheet 1
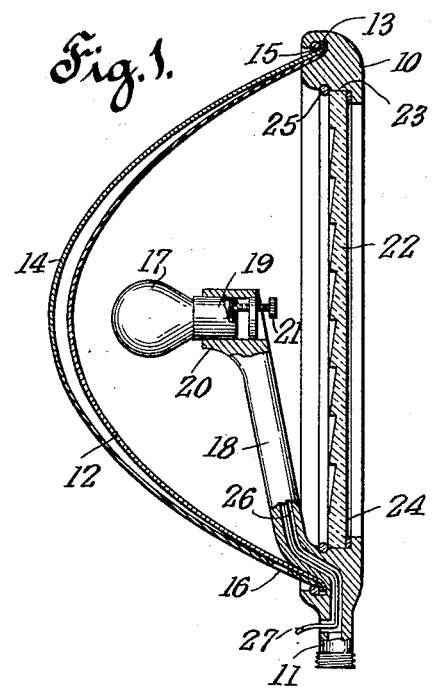
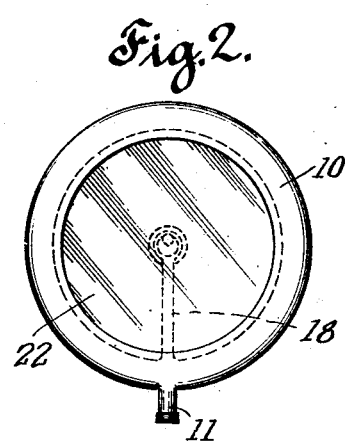
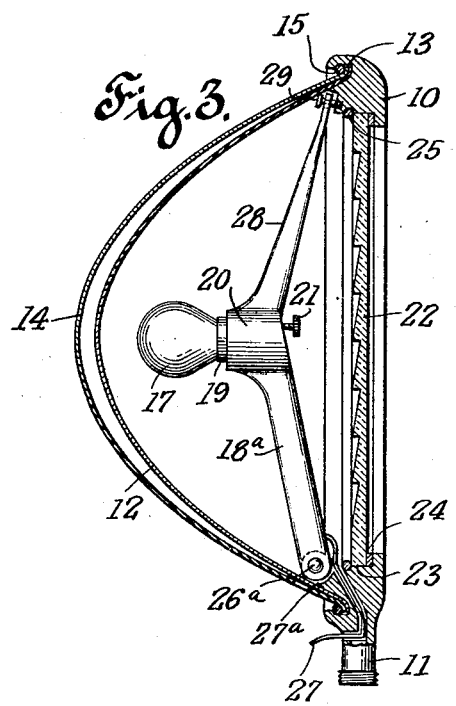
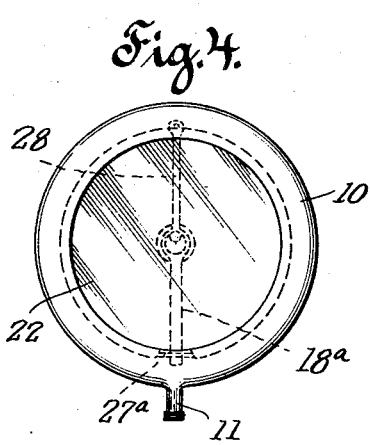
INVENTOR
Edmund B. Neil
BY Philip S. McLean
ATTORNEY April 28, 1931.     E. B. NEIL     1,802,524
LAMP
Filed Dec. 29, 1928     2 Sheets-Sheet 2

INVENTOR
Edmund B. Neil
BY
Philip S. McGean
ATTORNEY

Patented Apr. 28, 1931

1,802,524

UNITED STATES PATENT OFFICE

EDMUND B. NEIL, OF OVERBROOK, PENNSYLVANIA

LAMP

Application filed December 29, 1928. Serial No. 329,188.

The objects of this invention are to provide a lamp for motor vehicles, airplanes, airport lighting, tractors, marine searchlights, and the like, which will be of simple design and construction, relatively inexpensive, practical and efficient; which will utilize to the best advantage the light furnished by the electric bulb or other illuminant; which will be thoroughly closed and protected as to all its parts, readily assembled or taken apart and which can be set at the proper focus and retained in that condition.

The foregoing and other desirable objects are attained by the novel features of construction, combination and relations of parts as hereinafter described and claimed.

The drawings accompanying and forming part of this specification illustrate certain of the practical embodiments of the invention, but it should be understood that the structure may be further modified without departure from the true spirit and basic scope of the invention.

Fig. 1 is a broken vertical sectional view of one form of the lamp; Fig. 2 is a smaller front elevation of the same; Figs. 3 and 4, 5 and 6, 7 and 8 are views similar to Figs. 1 and 2 illustrating other embodiments of the invention.

The body or frame of the lamp is illustrated as a single rigid ring 10 of circular or other desired outline, the same having or carrying as a rigid or integral extension of the same a mounting post 11, screw-threaded as indicated for enabling the supporting and securing of the lamp on the fender structure or lamp supporting brackets of the motor vehicle.

A reflector 12 of parabolic or other desired form is secured to the back of the lamp frame, or ring, for example, by engaging the rim of the same in an undercut groove-way or channel 13 in the back of the frame. This reflector is shown as covered and protected by a lamp shell 14 having its rim portion engaging over the rim of the reflector and the two held together in the channel by a spring expansion ring 15 engaged in the undercut portion. This shell is shown as spaced from the reflector and as having a circulation and drain opening 16 to overcome condensation tendencies in the reflector.

One special feature of the reflector is that it is continuous and imperforate in its central portion and an associated feature is the mounting of the bulb or illuminant 17 entirely in front of the reflector, faced into the central and most effective portion of the reflector. The mounting for the lamp bulb consists in Fig. 1 of a substantially radial arm 18 projecting on a slant upwardly and inwardly from the lower rim portion of the frame and carrying a lamp socket 19 at its upper end at substantially the center of the lamp.

For purposes of focusing, this lamp socket is shown as slidingly mounted in a hub portion 20 of the lamp supporting bracket and as shiftable back and forth by means of a screw 21.

The lamp is closed at the front by a lens or cover 22 set into a rearwardly facing seat 23 in the ring, in front of the lamp bulb bracket and held therein against a gasket 24 at the front by a spring ring 25.

The lamp bulb carrying arm 18 is shown as branched up from the lower part of the frame between the lens at the front and the reflector at the back and the same is shown as channeled at 26 to accommodate the wiring 27, said channel extending down through the base of the bracket, the body of the ring and out through the side of the supporting post 11, so that all wiring is out of the way and does not interfere with the assembly or dis-assembly of the lamp.

The frame of the lamp is made sufficiently heavy and rigid to carry all the parts. In assembling, the lens or front cover is dropped into its seat in the space between the back of the frame and the front of the lamp bulb bracket and locked into position by the securing ring 25. Then after the lamp bulb is mounted in the socket, the reflector and back cover may be seated in the back of the frame and locked into position by the ring 15. The focusing of the lamp bulb can be effected while temporarily holding the reflector in place, so that when the reflector and shell are finally secured in place, the lamp bulb will be in properly focused relation. The focusing mechanism then being entirely on the inside, the same will not be easily disturbed.

The form of the invention illustrated in Figs. 3 and 4 is generally similar to that described, the main distinction being that the lamp bulb carrying arm 18a is pivotally supported at its base at 26a between pivot lugs 27a projected back from the frame ring and is adjustably positioned by means of a second radial arm 28 extending upwardly and forwardly from the socket hub 20 and secured adjustably at the top by screw 29 engaging a screw seat in the back of the frame ring. By adjustment of this screw, the entire lamp bulb support will be tilted on pivot 26a for the purpose of centering the lamp bulb relative to the reflector and if further focusing adjustment is necessary, this can be accomplished by screw 21.

Figure 6:
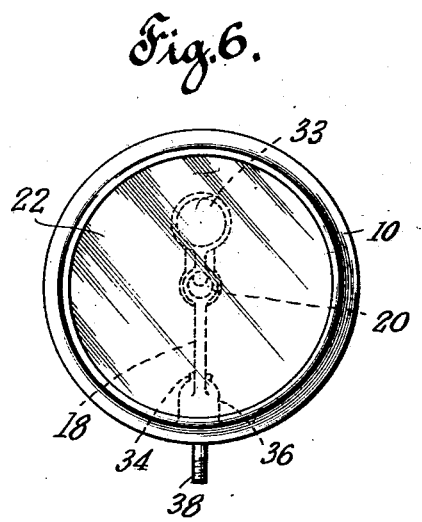

In Figs. 5 and 6, the rigid or non-adjustable type of lamp bulb supporting arm 18 is employed, but in this particular disclosure, the arm has extensions 30, 31 above the socket hub 20, carrying the smaller lamp bulb 32 and the condensing lens 33 respectively. This small lamp bulb may be wired in a circuit independent of the main lamp bulb, as indicated in a general way in Fig. 5. This view also illustrates how the reflector and shell, if the latter is used, may be pivoted at 34 to the base of the lamp supporting arm or bracket and be releasably held at the top by a wing nut 35 screwing in the top of the frame. In this particular disclosure, also the reflector and shell are shown as slotted in their lower edges at 36 to extend forwardly closely about the base of the lamp bulb carrying bracket or post 18 and this bracket is shown as carrying the socket element of the detachable circuit connection 37. The post for mounting the lamp structure is shown in this case as a screw rod 38 rigidly secured in the hollowed base 39 in the lamp ring, being thereby made in effect an integral part of the lamp frame.

Figure 7:
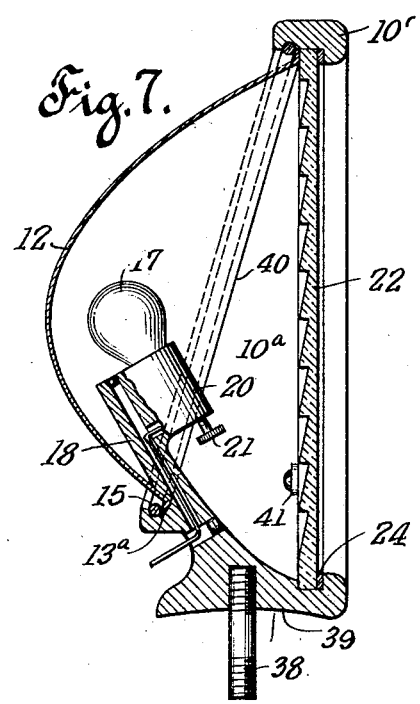
Figure 8:
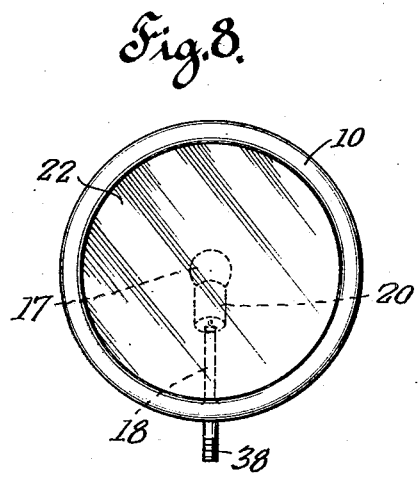

In the construction shown in Figs. 7 and 8, the lamp ring is continued out from the lower edge to provide an extension 10a meeting the hollow of the reflector, which in this case is cut off on a chord 40 to fit the seat 13a in the downwardly and rearwardly inclined back extension of the ring. The lamp bulb in this particular case is shown as set on an incline with respect to the focal axis, so that the adjustment of the screw 21 will have the effect of shifting the lamp bulb on such incline across the focal plane.

In the last two forms of the invention disclosed, the reflector serves to hold the lens or front cover in place, particularly at the top, and if desirable, one or more screw clamps, such as shown at 41 in Fig. 7, may be employed for holding the lens at the bottom or side portions of the same.

The lamp constructed as disclosed is particularly rigid and strong and when assembled and properly focused is sealed up with the focusing adjustment inside, where it will not likely be disturbed.

The lamp frame with the mounting post and lamp bulb carrying arm may be made integral as a single rugged casting, but the structure may be made up in other ways, for instance, in the form of a sheet metal stamping or stampings or the like, riveted, welded, or otherwise suitably secured together.

What is claimed is:

A lamp structure comprising a rigid annular frame having a rigid mounting post by which said frame may be secured in rigid relation on a motor vehicle, a rigid bracket projecting into the annular frame from that portion of the frame where the rigid mounting post is located, whereby the annular frame, mounting post therefor and inwardly projecting bracket constitute all a single rigid unit, said rigid frame having an annular rearwardly facing seat in front of said inwardly projecting bracket, a cover engaged in said rearwardly facing seat in front of said bracket, a rearwardly faced lamp socket in front of the bracket and a reflector having an unbroken reflecting surface disposed in rear of said lamp socket and means for detachably securing said reflector to the back of the rigid frame, whereby both the front cover and said reflector may be removed and replaced without interference from the lamp socket bracket.

In testimony whereof I affix my signature.

EDMUND B. NEIL.